United States Patent
Penttinen et al.

(10) Patent No.: US 9,937,681 B2
(45) Date of Patent: Apr. 10, 2018

(54) METHOD FOR IMPROVING THE HEAT SEALABILITY OF PACKAGING MATERIAL AND METHOD FOR MANUFACTURING HEAT-SEALED CONTAINER OR PACKAGE

(75) Inventors: Tapani Penttinen, Huutjarvi (FI); Kimmo Nevalainen, Kotka (FI); Jurkka Kuusipalo, Tampere (FI); Tapio Koskinen, Tampere (FI); Sami Kotkamo, Tampere (FI)

(73) Assignee: STORA ENSO OYJ, Helsinki (FI)

( * ) Notice: Subject to any disclaimer, the term of this patent is extended or adjusted under 35 U.S.C. 154(b) by 1243 days.

(21) Appl. No.: 13/695,496

(22) PCT Filed: Apr. 27, 2011

(86) PCT No.: PCT/FI2011/050381
§ 371 (c)(1),
(2), (4) Date: Feb. 14, 2013

(87) PCT Pub. No.: WO2011/135182
PCT Pub. Date: Nov. 3, 2011

(65) Prior Publication Data
US 2013/0137562 A1 May 30, 2013

(30) Foreign Application Priority Data
Apr. 30, 2010 (FI) .................................. 20105471

(51) Int. Cl.
*A61F 13/15* (2006.01)
*B05D 3/00* (2006.01)
(Continued)

(52) U.S. Cl.
CPC ............... *B31B 1/74* (2013.01); *B29C 65/02* (2013.01); *B29C 66/028* (2013.01); *B29C 66/71* (2013.01);
(Continued)

(58) Field of Classification Search
CPC ........... B31B 1/74; B32B 27/10; B32B 27/12; B32B 27/36; B32B 37/153;
(Continued)

(56) References Cited

U.S. PATENT DOCUMENTS 3,360,448 A * 12/1967 Schneider ............... B29C 59/16
427/553
4,631,155 A * 12/1986 Caines .................... B29C 59/16
156/272.2

(Continued)

FOREIGN PATENT DOCUMENTS

DE 1629772 5/1971
DE 202009005105 12/2009
(Continued)

OTHER PUBLICATIONS

ISO Standard 21348. "Definitions of Solar Irradiance Spectral Categories." Retrieved from http://www.spacewx.com/pdf/SET_21348_2004.pdf.*
(Continued)

*Primary Examiner* — Philip C Tucker
*Assistant Examiner* — Brian R Slawski
(74) *Attorney, Agent, or Firm* — Young & Thompson

(57) ABSTRACT

A method for improving the heat sealability of a packaging material and a method for manufacturing a heat-sealed container or package are described. The material can be polymer-coated packaging paper or cardboard, or a polymeric packaging film. The material includes a polymer layer that contains polyester, particularly polylactide, the heat sealability of which is improved by ultraviolet radiation. Polylactide is useful as such or when blended, for example, with other biodegradable polyester. The containers and packages thus manufactured include disposable drinking cups and cardboard carton and box packages.

15 Claims, 4 Drawing Sheets

Figure 1:
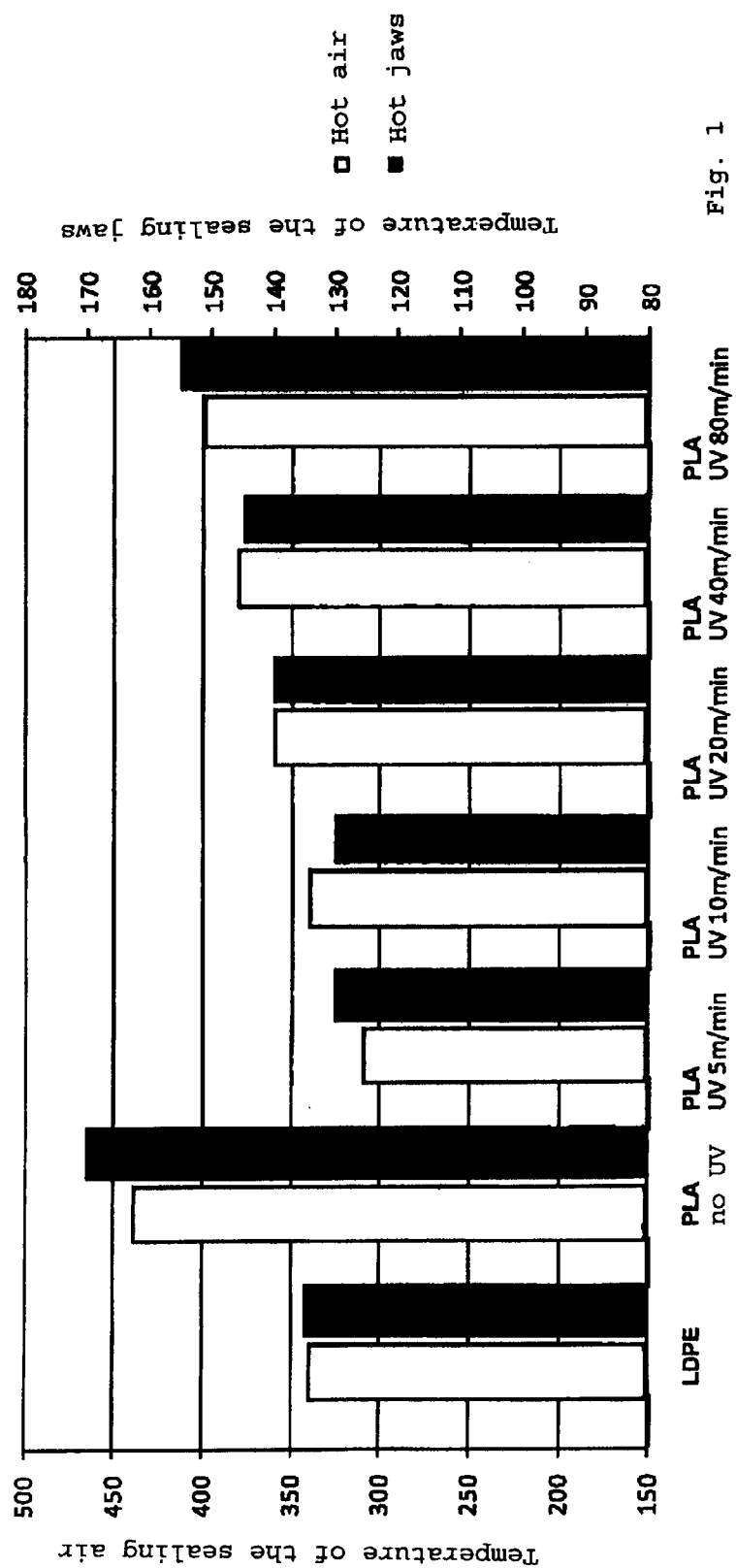

(51) Int. Cl.

| | | |
|---|---|---|
| *B29C 53/00* | (2006.01) | |
| *B29C 47/00* | (2006.01) | |
| *B29C 65/00* | (2006.01) | |
| *B29C 47/06* | (2006.01) | |
| *B31B 1/62* | (2006.01) | |
| *B31C 11/04* | (2006.01) | |
| *B31C 7/00* | (2006.01) | |
| *B32B 37/00* | (2006.01) | |
| *B32B 27/00* | (2006.01) | |
| *B65C 9/25* | (2006.01) | |
| *C08J 5/00* | (2006.01) | |
| *C08J 7/18* | (2006.01) | |
| *G21H 5/00* | (2006.01) | |
| *B31B 1/74* | (2006.01) | |
| *B29C 65/02* | (2006.01) | |
| *B29C 71/04* | (2006.01) | |
| *B32B 9/02* | (2006.01) | |
| *B32B 27/12* | (2006.01) | |
| *C08J 5/12* | (2006.01) | |
| *C08J 7/12* | (2006.01) | |
| *C09J 5/06* | (2006.01) | |
| *B32B 7/12* | (2006.01) | |
| *B32B 27/08* | (2006.01) | |
| *B32B 27/10* | (2006.01) | |
| *B32B 27/36* | (2006.01) | |
| *B31B 50/74* | (2017.01) | |
| *B29C 65/10* | (2006.01) | |
| *B29C 65/18* | (2006.01) | |
| *B29C 35/08* | (2006.01) | |
| *B29K 67/00* | (2006.01) | |

(52) U.S. Cl.
CPC .......... *B29C 66/723* (2013.01); *B29C 66/919* (2013.01); *B29C 66/9141* (2013.01); *B29C 66/9192* (2013.01); *B29C 66/91423* (2013.01); *B29C 71/04* (2013.01); *B31B 50/74* (2017.08); *B32B 7/12* (2013.01); *B32B 9/02* (2013.01); *B32B 27/08* (2013.01); *B32B 27/10* (2013.01); *B32B 27/12* (2013.01); *B32B 27/36* (2013.01); *C08J 5/121* (2013.01); *C08J 7/123* (2013.01); *C09J 5/06* (2013.01); *B29C 65/10* (2013.01); *B29C 65/18* (2013.01); *B29C 66/4322* (2013.01); *B29C 66/72328* (2013.01); *B29C 2035/0827* (2013.01); *B29K 2067/00* (2013.01); *B29K 2067/046* (2013.01); *B32B 2255/12* (2013.01); *B32B 2255/26* (2013.01); *B32B 2274/00* (2013.01); *B32B 2307/31* (2013.01); *B32B 2439/40* (2013.01); *B32B 2553/00* (2013.01); *C08J 2367/04* (2013.01); *C09J 2205/31* (2013.01); *C09J 2467/00* (2013.01)

(58) Field of Classification Search
CPC ............. B32B 2270/00; B32B 2307/31; Y10T 428/1352; Y10T 428/1303; Y10T 428/31786; B29C 2035/0827; B29C 47/0021; B29C 66/112; B65D 65/466
USPC .... 156/60, 196, 217, 218, 227, 242, 244.11, 156/293, 308.2, 308.4, 308.6, 309.6, 321, 156/324, 325, 326, 327, 332; 264/173.16; 427/553, 557, 558
See application file for complete search history.

(56) References Cited

U.S. PATENT DOCUMENTS

| | | | |
|---|---|---|---|
| 4,822,451 A * | 4/1989 | Ouderkirk | ............... B29C 59/16 156/272.2 |
| 6,645,584 B1 | 11/2003 | Kuusipalo et al. | |
| 2002/0065345 A1 | 5/2002 | Narita et al. | |
| 2002/0136848 A1 | 9/2002 | Yoshii et al. | |
| 2004/0016208 A1 | 1/2004 | Mumpower et al. | |
| 2005/0106345 A1 | 5/2005 | Kawahara et al. | |
| 2005/0192410 A1 | 9/2005 | Scheer et al. | |
| 2006/0172131 A1 | 8/2006 | Haedt et al. | |
| 2007/0037912 A1* | 2/2007 | Mohanty | ................... C08J 5/18 524/445 |
| 2007/0259195 A1 | 11/2007 | Chou et al. | |
| 2008/0274245 A1 | 11/2008 | Lee et al. | |
| 2009/0078669 A1 | 3/2009 | Sakaguchi et al. | |
| 2009/0230487 A1* | 9/2009 | Saitoh | ................... B81B 7/0061 257/419 |
| 2011/0092622 A1* | 4/2011 | Kaneda | ............... C08K 5/34928 524/100 |

FOREIGN PATENT DOCUMENTS

| | | | | |
|---|---|---|---|---|
| DE | 202009005105 U1 * | 12/2009 | ............... | B32B 9/02 |
| EP | 0445524 A2 | 9/1991 | | |
| EP | 1094944 | 5/2001 | | |
| FI | 20105247 | 9/2012 | | |
| JP | 55124624 A * | 9/1980 | ............... | B29D 7/00 |
| JP | 61181840 | 8/1986 | | |
| JP | 2000086877 | 3/2000 | | |
| JP | 2002519222 | 7/2002 | | |
| WO | WO 2009153934 A1 * | 12/2009 | ......... | C08K 5/34928 |

OTHER PUBLICATIONS

FI Office Action, dated Sep. 29, 2015; Application No. 20105471.
International Search Report dated Aug. 30, 2011, corresponding to PCT/FI2011/050381.
Japanese Office Action, dated Jan. 29, 2015, in corresponding Japanese Patent Application No. 2013-506695.
CL Examiner's Report, dated Dec. 15, 2014, from corresponding CL application.
European Search Report, dated Feb. 28, 2014, from corresponding EP application.

\* cited by examiner

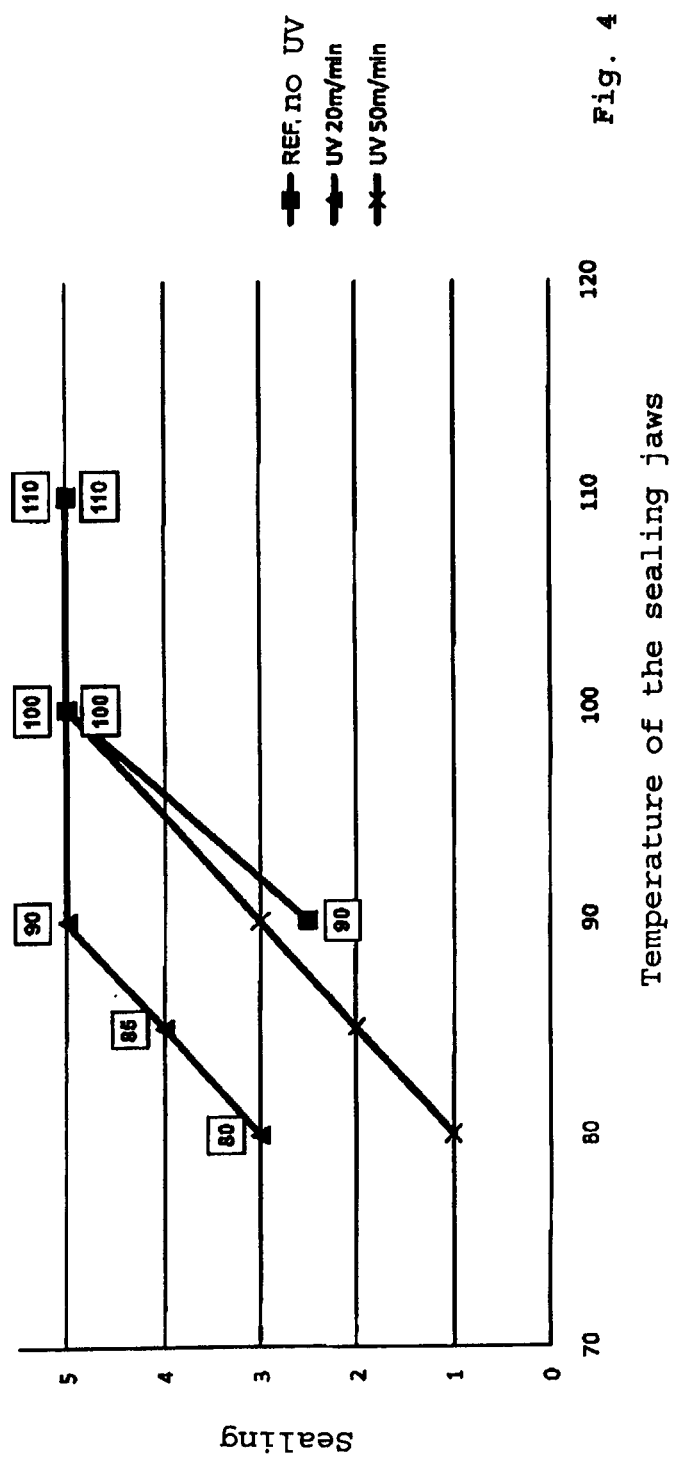

METHOD FOR IMPROVING THE HEAT SEALABILITY OF PACKAGING MATERIAL AND METHOD FOR MANUFACTURING HEAT-SEALED CONTAINER OR PACKAGE

BACKGROUND OF THE INVENTION

Field of the Invention

The invention relates to a method for improving the heat sealability of a packaging material and a method for manufacturing a heat-sealed container or package. The invention further relates to a method for sealing polylactide, such as a packaging film that contains polylactide.

Description of the Related Art

In the packaging technology, heat sealing is a conventional method for manufacturing or closing containers or packages made of polymer film or polymer-coated packaging material, such as paper or cardboard. Low density polyethylene (LDPE) is a material commonly used in packages due to its easy heat sealability. Furthermore, many other polymers are used in packages, for example, polyesters which, unlike LDPE, are biodegradable or have better water vapour and/or oxygen barrier properties than LDPE. These other polymers, however, are often more difficult to heat-seal than LDPE, which is why they are not readily placed in the surface layer of the packaging material, but in the inner layers of multilayer materials.

Polyethylene terephthalate (PET) is polyester, which is frequently used in packages and containers, has good barrier properties, and is very heat-resistant, which is why it is suitable for the coating of baking cardboard, among others. A disadvantage is that PET is difficult to heat-seal. Moreover, conventional PET is non-biodegradable.

A biodegradable polymer that is commonly used in biodegradable packages consisting of polymer film or polymer-coated paper or cardboard is polylactide (PLA). Polylactide has relatively good water vapour and gas barrier properties, but one problem with its use is its fairly high melting temperature and the resulting poor heat sealability. The adhesion of polylactide to a fibrous substrate of paper or cardboard in extrusion has also been problematic; an adequate adhesion requires a high extrusion temperature and a large layer thickness of PLA.

To improve the adhesion of polylactide, the specification EP-1094 944 B1 discloses an inner adhesion layer that is co-extruded together with an outer layer of polylactide and that consists of another biodegradable polymer, such as polyester amide, cellulose ester or aliphatic or aromatic copolyester. To improve the heat sealability of polylactide, the specification US 2002-0065345 A1, again, discloses the blending of polylactide with a biodegradable aliphatic polyester consisting of diol and dicarboxylic acid, for example, polycaprolactone (PLC) or polybutylene succinate adipate (PBSA), the portion of which in the mixture is at least 9%. According to the patent specification, the mixture can be extruded into a film, which can be axially or biaxially stretched and which can be attached to the fibrous substrate by lamination.

According to the specification US 2005-0192410 A1, the processability of polylactide is improved by blending polycaprolactone and mineral particles with it. The specification US 2007-0259195 A1 further describes polylactide-based films and polymer coatings, which are extruded onto a fibrous substrate and wherein polybutylene adipate terephthalate (PBAT) is blended with polylactide to improve its heat-resistance. The patent application FI-20105247, which pertains to the applicant and is still classified when the present application is being made, describes a polylactide-based two-layer coating, which is extruded onto the fibrous substrate, and with the outer layer of which a larger portion of biodegradable polyester (other than polylactide) is blended than with its inner layer to optimize the adhesion between polylactide and the fibrous substrate and the heat sealability of polylactide.

When the heat sealability of polylactide is improved by the other polyester or some other similar additive that is blended therewith, there is the disadvantage that these additives are much more expensive than polylactide. Furthermore, the blending of polymers constitutes an extra working phase in the complex process. Hence, there exists a need for an alternative solution with lower costs to improve the heat sealability of polylactide. Likewise, there is a need to facilitate the heat sealability of other polyester films and coatings used in the packaging field.

SUMMARY OF THE INVENTION

The present invention provides a solution to satisfy the requirements mentioned above, according to which ultraviolet radiation is directed to the polymer layer that contains polyester and pertains to the packaging material. The material can be a single or multilayer polymeric packaging film, or packaging paper or cardboard, wherein a single or multilayer polymer coating is brought onto the fibrous substrate by laminating or extruding, its top layer that contains polyester being UV radiated. According to the invention, the manufacturing of the container or package comprises providing the fibrous substrate with a polymer coating that contains polyester, UV radiating the coating, and sealing the container or package by heat-sealing the coating. Preferable polyester in the invention is polylactide that is biodegradable.

According to the invention, it has been observed that UV radiation that is directed to a film or a coating layer that contains polylactide, in particular, considerably improves the heat sealability of polymer by lowering the required heat-sealing temperature to a level that corresponds to the LDPE commonly used, or even below. The decrease in the heat-sealing temperature caused by radiation is the highest on polylactide alone, but also considerable on the mixtures of polylactide and other polymers, such as another biodegradable polyester. According to observations, the impact of UV radiation on a PET film or coating is lesser but significant, nonetheless.

When polylactide constitutes the coating polymer of the fibre-based packaging material, such as paper or cardboard, it can be extruded, for example, when mixed with the other biodegradable polyester, directly onto the cardboard base without the need of an intermediate polymeric adhesive layer. The inner adhesive layer that is co-extruded with polylactide is, however, preferable in that the outer heat-sealing layer can thus consist of technical polylactide only, which, according to observations, has the benefit produced by the UV radiation, the decrease in the heat-sealing temperature, at its maximum.

The containers and packages which, according to the invention, can be heat-sealed from the fibre-based polymer-coated packaging material manufactured according to above, include cardboard cups, such as disposable drinking cups, and cardboard box and carton packages, such as confectionary, biscuit, flake, cereal, cosmetic, and bottle packages, and milk and juice cartons. The drinking cups can be polymer-coated on the inside and uncoated on the outside, whereby in the invention, the vertical seam of the cup is created by sealing the polymer coating of the inner surface to the uncoated cardboard of the outer surface. In box packages, instead, the outer surface of the package can be polymer-coated and the inner surface uncoated, whereby in the sealing, the polymer coating of the outer surface is heat-sealed to the uncoated cardboard surface of the interior of the package. In cups, such as drinking cups, and in box packages, however, the cardboard is often polymer-coated on both sides, whereby according to the invention, the coating of both sides can be UV radiated and, in the heat sealing, the coating layers are sealed to each other. Also in this case, the UV radiation according to the invention improves the heat sealability of polyester.

In the tests related to the invention, it has been observed that ultraviolet radiation improves the sealability of polylactide or a mixture containing polylactide in heat sealing that is carried out both with hot air and heated sealing jaws.

In addition to the polymer-coated fibre-based packaging materials, the invention also relates to polylactide-based packaging films, in particular, the heat sealability of which the UV radiation improves. According to the invention, polylactide is in the surface layer of the film as such or in a blended form, and regarding the heat sealability of the film, the same essentially applies as presented above with respect to the polymer-coated packaging papers and cardboards that contain PLA.

BRIEF DESCRIPTION OF THE DRAWING FIGURES

Figure 2:
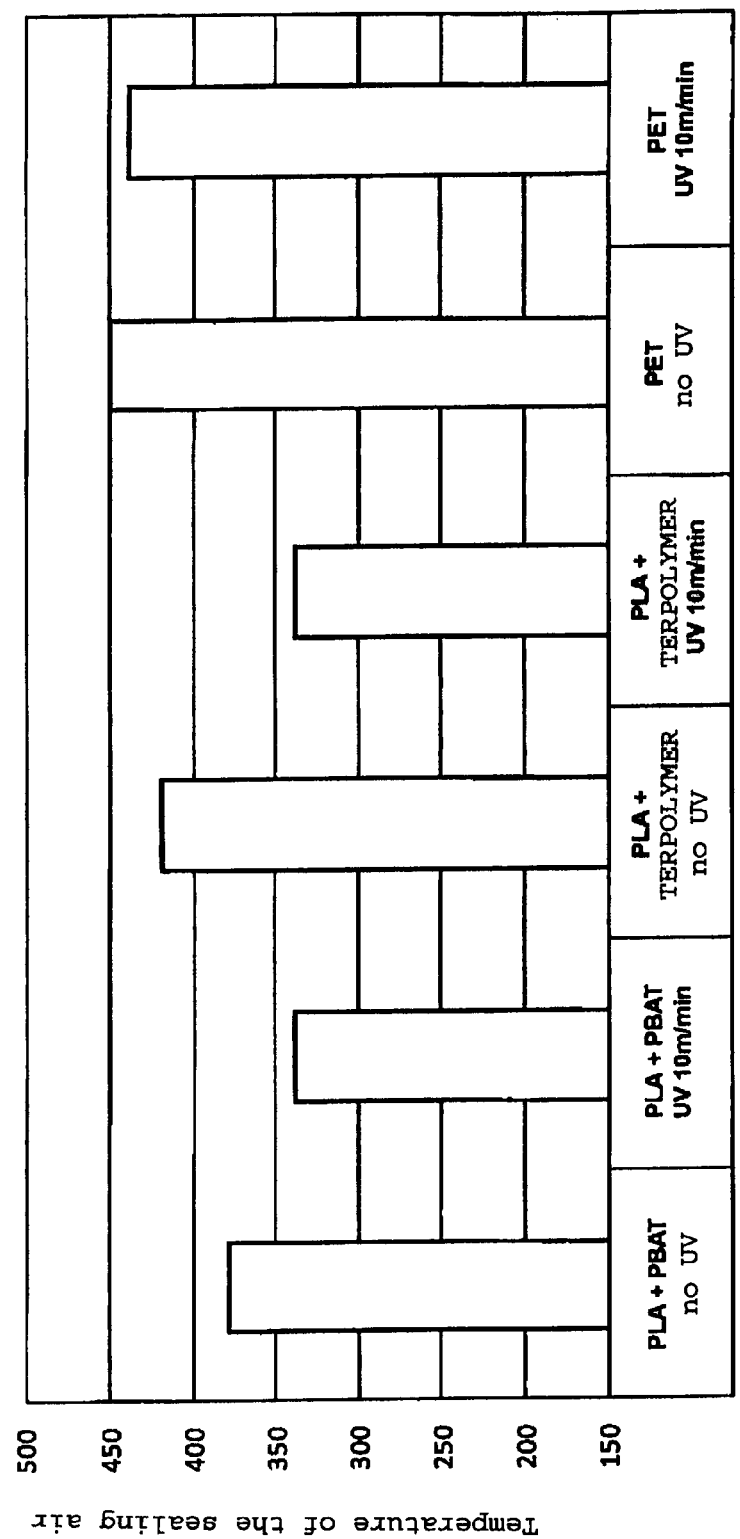
Figure 3:
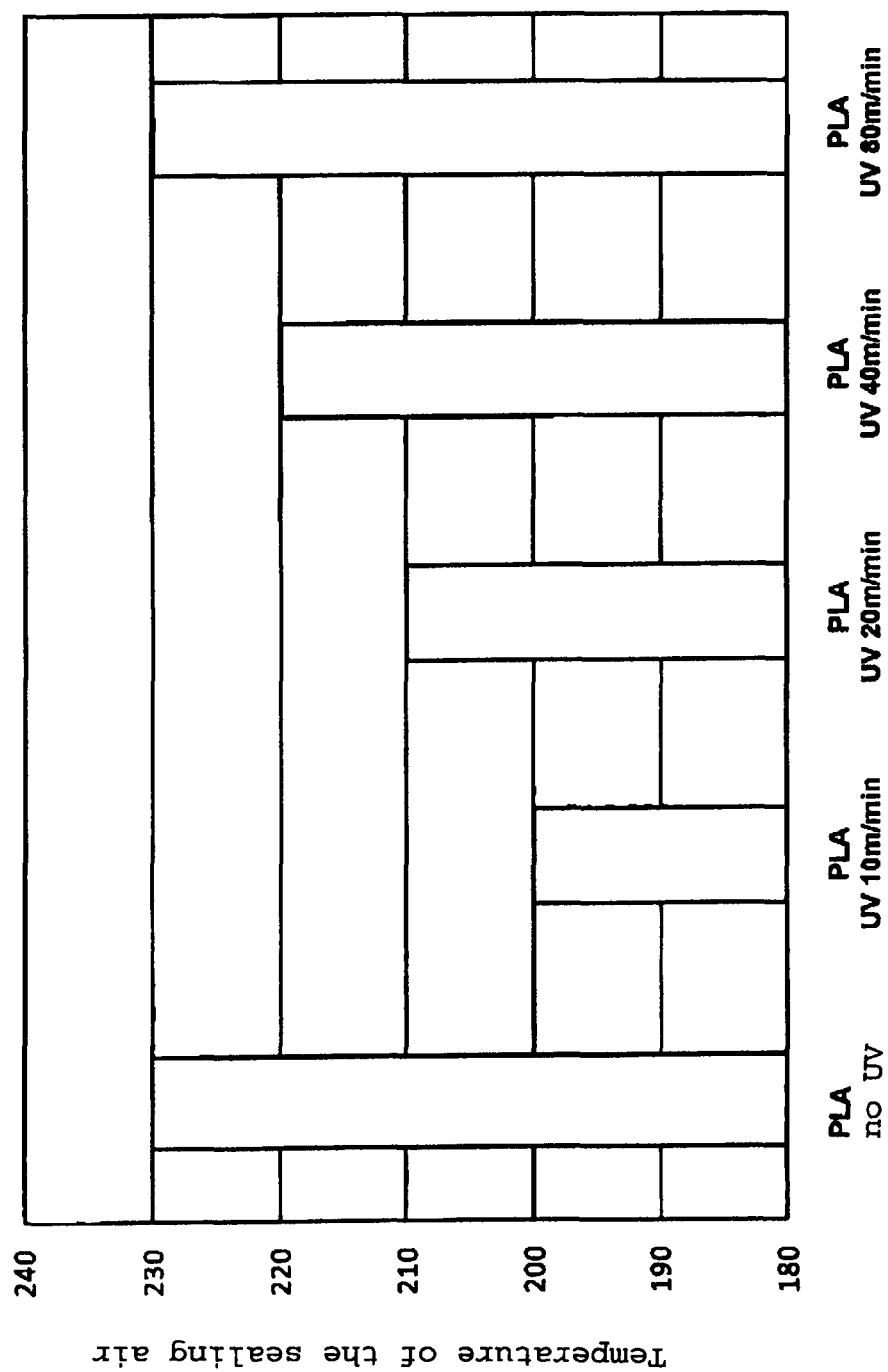

FIG. 1 shows sealing results for example 1.
FIG. 2 shows sealing results for example 2.
FIG. 3 shows sealing results for example 3.
FIG. 4 shows sealing results for example 4.

DETAILED DESCRIPTION OF THE INVENTION

One example of the preferred implementations of the invention is to co-extrude, onto paper or cardboard made of kraft, CTMP or mechanical pulps, the weight of which is 40-350 g/m$^2$, a two-layer coating that has an inner adhesion layer of a weight of 5-20 g/m$^2$ that consists of biodegradable polyester (other than polylactide), such as PBAT, or a mixture of polylactide (50-95 weight-%) and other biodegradable polyester (5-50 weight-%), such as PBAT, and an outer heat-sealing layer of a weight of 5-20 g/m$^2$ that consists of polylactide or a mixture of polylactide (40-80 weight-%) and other biodegradable polyester (20-60 weight-%), such as PBAT. The other side of the paper or cardboard can be left uncoated. The polymer-coated web is conveyed past an ultraviolet lamp, the wavelength of which is 100-400 nm, with its coated side towards the lamp, at a velocity of 5-100 m/min, preferably 5-20 m/min. The UV-radiated web is cut into blanks, which are heat-sealed into containers, such as cardboard drinking cups, or packages, such as packing boxes or cartons. The sealing can be performed with hot air, whereby the air temperature can be about 310-400° C. For materials that are radiated more intensively, that is, at a slower web velocity, the air temperature required for a complete sealing is lower than for materials that receive less radiation. Instead of hot air, sealing jaws can be used, the temperature of which can be about 130-160° C.; also in this case, the lowest for materials that are radiated the most.

Instead of a moving web, the UV radiation can also be directed to the sealing lines of a web or blank that is stationary with respect to the radiator, which lines thus receive a larger portion of radiation, while the other parts of the polymer surface are not exposed to radiation. Tray blanks consisting of PET-coated baking cardboard should be cited as an example.

In the following, the invention is described in more detail by means of application examples and tests conducted.

Example 1

Onto packing board weighing 280 g/m$^2$, an inner adhesion layer was co-extruded, consisting of polybutylene adipate terephthalate (PBAT) and weighing 10 g/m$^2$, and an outer heat-sealing layer that consisted of technical polylactide and weighed 15 g/m$^2$. The extruded two-layer coating was allowed to cool. Thereafter, the coated cardboard web was conveyed at a velocity of 10 m/min to an UV radiator (UV-technik, model UVH-lamp), the electric power of which was 120 W/cm and its energy spectrum in different wavelength ranges was about 15% UV-C, about 8% UV-B, about 7% UV-A, about 15% visible light, and about 55% IR. A blank that was cut from the radiated cardboard was bent and heat-sealed into the conically widening jacket of a drinking cup, so that the coated and radiated inner surface of the cup was sealed to the uncoated outer surface of the cup that was not radiated. The sealing was carried out with hot air of 340° C., and by hot sealing jaws, the temperature of which was 130° C. In each case, a perfect sealing was accomplished, during the opening of which, a 100% tear occurred in the fibre layer. In other words, no opening of the seal by peeling off could be observed.

Example 2

Onto the packing board used in example 1, a single-layer coating was extruded, its composition being 45% polylactide and 55% PBAT, and weighing 24 g/m$^2$. After the coating had cooled, the coated web was radiated by the UV radiator used in example 1, the velocity of the web being 10 m/min. A blank that was cut from the coated and radiated cardboard was bent and heat-sealed into the jacket of a drinking cup, similarly to example 1. The sealing was carried out with hot air of 340° C. A perfect sealing was accomplished, during the opening of which, a 100% tear occurred in the fibre layer.

Example 3

Onto the packing board according to example 1, a single-layer coating was extruded, its composition being 95% polylactide and 5% ethylene butyl acrylate glycidyl methacrylate terpolymer, and weighing 25 g/m$^2$. After cooling, the web was UV-radiated and a blank that was cut from the web was bent and heat-sealed into the jacket of a drinking cup, similarly to example 2. A perfect sealing was accomplished by sealing with hot air of 340° C., during the opening of which, a 100% tear occurred in the fibre layer.

Testing

The reference material was packing board weighing 210 g/m$^2$, which had an extruded low density polyethylene (LDPE) single-layer coating on it, weighing 25 g/m$^2$. The test material was packing board weighing 210 g/m$^2$, which had a polylactide (PLA) single-layer coating extruded onto it, weighing 27 g/m$^2$. A test series was created from this by conveying the PLA-coated cardboard past the UV radiator mentioned above in example 1 at five different velocities, which were 5 m/min, 10 m/min, 20 m/min, 40 m/min, and 80 m/min. Additionally, the test series included a PLA-coated cardboard that was not radiated.

The materials described above were heat-sealed, in each case, by sealing the polymer-coated side of the cardboard to the uncoated counter surface of the cardboard. The sealing was carried out with hot air or hot sealing jaws at different temperatures to find the lowest temperature, at which the perfect sealing could be achieved. The criterion then was for the seal not to open by peeling off, but by tearing off 100% from the cardboard layer.

The results of the sealing tests are presented graphically in the appended drawing 1. It can be observed that the PLA-coated cardboard that was not UV-radiated required a considerably higher sealing temperature than the LDPE-coated cardboard that was used as reference material. The UV radiation clearly decreased the sealing temperature of the PLA-coated cardboard at all web velocities used; the more, the slower the web velocity was. For the PLA-coated cardboard that was radiated at a velocity of 10 m/min, the sealability was at least as good as that of the reference material, the LDPE-coated cardboard that was not radiated, and at a velocity of 5 m/min, even clearly better. The result was essentially the same in the sealing carried out both with hot air and the hot sealing jaws.

The tests were continued by the heat sealing of the cardboard obtained according to the example 2 above and coated with the mixture of PLA and PBAT, the cardboard obtained according to example 3 and coated with the mixture of PLA and ethylene butyl acrylate glycidyl methacrylate terpolymer, and the PET-coated (25 g/m$^2$) cardboard (280 g/m$^2$). The sealing processes were carried out with hot air only. In addition to the UV-radiated test materials, the reference materials comprised the same coated cardboards without the UV radiation. The results are shown in the appended drawing 2. It can be seen that for both coating compositions containing PLA, the UV radiation clearly decreases the temperature required for a perfect heat sealing. For PET, the decrease in sealing temperature was minor and yet adequate to render the UV radiation reasonable, in practice.

In a third test series, the sealing of a PLA coating to itself on the cardboard was studied. PLA-coated cardboard, which was of the same grade as in the first test series, that is, a 27 g/m$^2$ PLA coating layer on cardboard weighing 210 g/m$^2$, was radiated by the UV radiator according to the above at web velocities of 10-80 m/min. The reference material comprised PLA-coated cardboard that was not radiated. The sealing was carried out by bending the cardboard and sealing its PLA coating against itself. The results are shown graphically in the appended drawing 3. By comparing with the first test series, it can be observed that it is clearly easier for the PLA layer to seal to itself than to an uncoated cardboard surface. Also in this case, however, the UV radiation of the PLA coating clearly improves the sealability.

In a fourth test series, PLA-coated cardboard according to the above was radiated by the above-mentioned UV radiator at web velocities of 20 m/min and 50 m/min, and the sealing was carried out by hot sealing jaws. The reference material comprised PLA-coated cardboard that was not radiated. The sealing temperature of the jaws was gradually raised to find the lowest temperature, at which the sealing would be perfect. The results are presented graphically in the appended drawing 4, where the vertical axis describes the sealing on the scale: (1) no sealing, (2) poor sealing; the seam rustles when opening, (3) poor sealing; the cardboard tears on less than 50% of the seam's surface area, (4) reasonable sealing; the cardboard tears on over 50% of the seam's surface area, and (5) perfect sealing; the cardboard tears throughout the seam's surface area. It can be observed that the UV radiation of the PLA coating also improves the sealing carried out by the jaws; in particular, at a slower web velocity of 20 m/min, the difference to the reference material not radiated is obvious.

The invention claimed is:

1. A method of improving the heat sealability of a packaging material, comprising:
    extruding onto a web of fibrous substrate selected from paper or cardboard a coating layer containing polylactide,
    moving the coated web of fibrous substrate at a speed of 5-100 m/min, and
    improving heat-sealability by directing ultraviolet radiation from an electrically powered UV radiator to said coating layer while said coated web is being moved, to obtain a UV radiated web of packaging material.

2. The method according to claim 1, wherein the polylactide and polybutylene adipate terephthalate are blended.

3. The method according to claim 1, wherein an inner polymeric adhesion layer and an outer polylactide-containing layer are co-extruded onto the fibrous substrate.

4. The method according to claim 1, wherein a wavelength of the UV radiation is 100-400 nm.

5. A method of manufacturing a heat-sealed container or package, comprising:
    providing a fibrous substrate selected from paper or cardboard which is provided with a polymer coating that contains polylactide;
    UV-radiating the coating from an electrically powered UV radiator, while a web of the coated substrate is being moved at a speed of 5-100 m/min, to obtain a UV radiated web of packaging material; and
    sealing the container or package by heat-sealing the UV-radiated coating polymer.

6. The method according to claim 5, wherein the container is a cardboard cup, the vertical seam of its jacket being formed by heat-sealing a polymer coating of the inner surface of the cup.

7. The method according to claim 6, wherein the polymer-coated inner surface of the cup is heat-sealed to uncoated outer surface of the cup.

8. The method according to claim 6, wherein the fibrous substrate is provided on both sides with a polymer coating and that, in the heat sealing of the container or package, the polymer coatings of its inner and outer surfaces are sealed to each other.

9. The method according to claim 5, wherein the package is a cardboard box package, its polymer-coated outer surface being heat-sealed to uncoated inner surface of the package.

10. The method according to claim 5, wherein the fibrous substrate is provided on both sides with a polymer coating and that, in the heat sealing of the container or package, the polymer coatings of inner and outer surfaces of the container or package are sealed to each other.

11. The method according to claim 5, wherein an inner polymeric adhesion layer and an outer polylactide-containing layer are co-extruded onto the fibrous substrate.

12. The method according to claim 5, wherein the heat sealing is carried out with hot air.

13. The method according to claim 5, wherein heat sealing is carried out by heated sealing jaws.

14. A method of sealing polylactide coated packaging material, comprising:

directing ultraviolet radiation from an electrically powered UV radiator to a surface of a moving paper or cardboard web moving at a speed of 5-100 m/min, said surface comprising polylactide or a polymer mixture that contains polylactide, to obtain a UV radiated web of packaging material, whereafter the radiated surface is heat-sealed to a counter surface.

15. The method according to claim 14, wherein a packaging film comprising polylactide or a polymer mixture that contains polylactide, or a surface layer of the film is heat-sealed.

* * * * *